United States Patent [19]

Strieber

[11] Patent Number: 6,019,264
[45] Date of Patent: Feb. 1, 2000

[54] STRAP ON IMPLEMENT SUPPORT MECHANISM

[76] Inventor: Louis Charles Strieber, 6800 West Gate Blvd. #139B316, Austin, Tex. 78745

[21] Appl. No.: 09/037,750

[22] Filed: Mar. 10, 1998

Related U.S. Application Data

[60] Provisional application No. 60/041,049, Mar. 22, 1997.

[51] Int. Cl.[7] ........................................................ A45F 5/00
[52] U.S. Cl. ........................... 224/270; 224/197; 224/662; 224/678; 224/930; 108/43
[58] Field of Search ..................... 224/270, 930, 224/662, 678, 197, 199, 254; 108/43; 248/444

[56] References Cited

U.S. PATENT DOCUMENTS

| | | | |
|---|---|---|---|
| 984,402 | 2/1911 | Tuttle | 224/678 |
| 4,587,757 | 5/1986 | Lirette | 224/251 |
| 4,715,293 | 12/1987 | Cobbs | 224/930 |
| 4,976,387 | 12/1990 | Spianti | 224/908 |
| 4,991,758 | 2/1991 | Eaneff | 224/908 |
| 5,207,791 | 5/1993 | Scherbarth | 224/270 |
| 5,464,136 | 11/1995 | Eddy | 224/662 |

FOREIGN PATENT DOCUMENTS

| | | | |
|---|---|---|---|
| 132984 | 9/1951 | Sweden | 248/444 |

*Primary Examiner*—Linda J. Sholl

[57] ABSTRACT

A strap on implement support mechanism which includes a belt, a support extending from the belt, and an implement engaged to the support such that the computer implement remains on the support during normal movement as walking, sitting, getting up from the sitting position, bending down, turning around, and twisting around. The implement is preferably a computer implement. A shock absorber is preferably engaged between the belt and the support to minimize jarring to the computer implement when the support comes into contact with an object. The vented belt mechanism includes a relatively wide and cushioned section between the belt and the person to distribute the pressure from wearing the belt over a rather large area of the midsection of the person wearing the strap on support mechanism. The support includes a framework having frame portions extending laterally, vertically, longitudinally, and obliquely. Frame portions preferably define a periphery of the support and a net is preferably engaged to the frame portions for supporting the computer implement. The net by itself or another connector such as a hook and loop connector, minimizes lateral and transverse movement of the computer implement relative to the support. Additionally, the netting provides adequate ventilation for the implement such as for a computer.

20 Claims, 4 Drawing Sheets

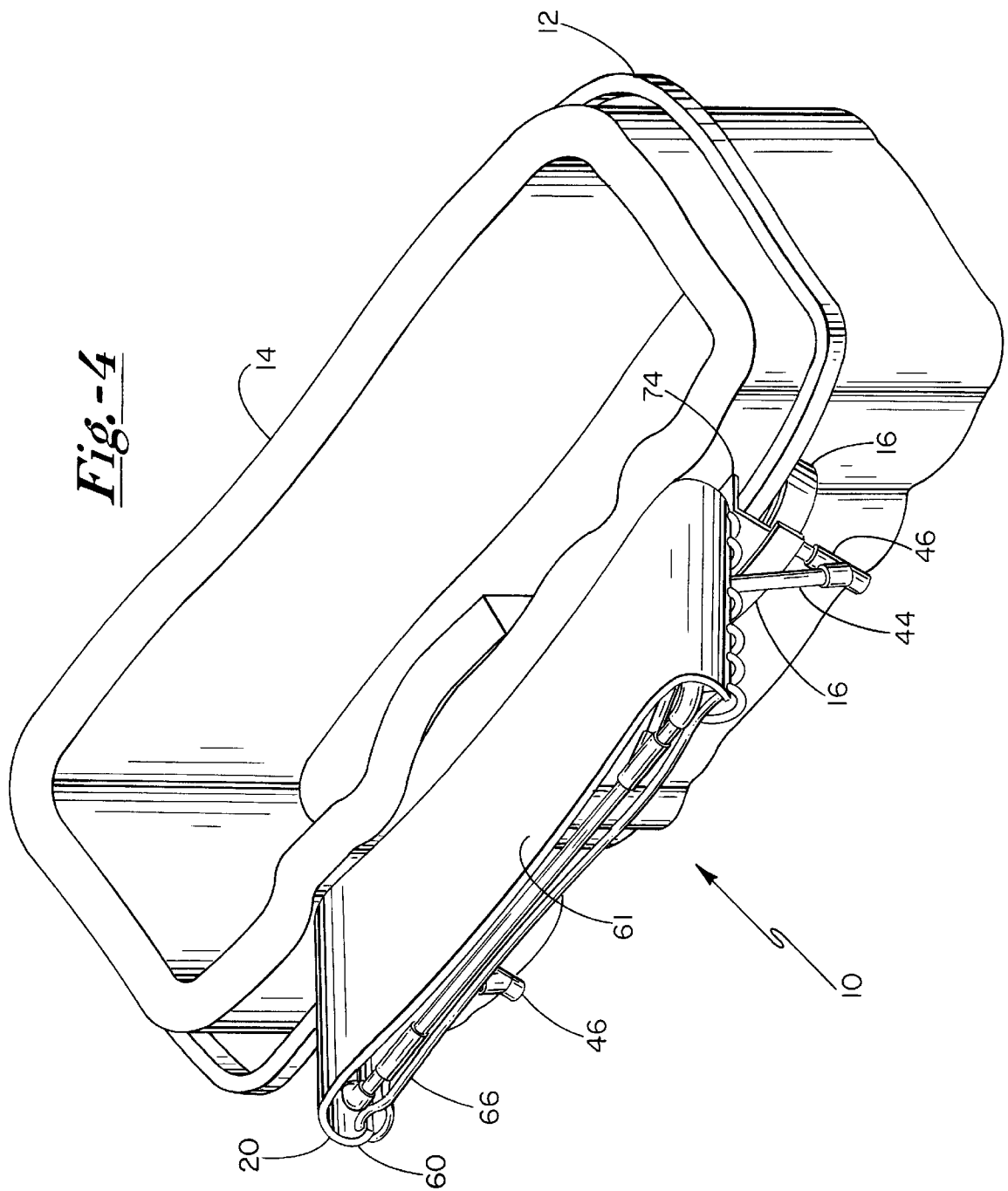

STRAP ON IMPLEMENT SUPPORT MECHANISM

This application claims the benefit under 35 U.S.C. § 119(e) of my U.S. provisional patent application No. 60/041,049 filed Mar. 22, 1997, which is hereby incorporated by reference in its entirety into this application.

FIELD OF THE INVENTION

This application relates generally to belts, particularly to supports strapped onto the belt, and specifically to strap on supports in combination with implements, preferably computer implements.

BACKGROUND OF INVENTION

A keyboard is a popular means by which one interacts with a computer. Other means includes voice interaction using voice recognition technology, and touch screens. A monitor is almost universally used in combination with a keyboard so that one may visually verify the characters or information entered into the computer via the keyboard.

Monitors and computers are now relatively lightweight to be hand portable. These laptop or notebook computers, however, tend to be rather expensive and relatively fragile to impacts. Of the various kinds of computers, laptop or notebook computers most frequently are returned for service.

Wireless connections between the keyboard and computer are possible. One type of such wireless connection uses infrared technology.

SUMMARY OF THE INVENTION

A feature of the present invention is a belt having a support extending therefrom, with an implement engagable on the support.

Another feature is the provision between the belt and the support of a resilient member to minimize jarring of the implement.

Another feature is the provision of a relatively wide wrap around cushion extending between the belt and the person to distribute pressure over a relatively large surface area about the user's hips.

Another feature is the provision of a framework for the support and a net stretched between portions of the framework for supporting the computer implement.

Another feature is the provision of a connector between the support and the computer implement to minimize a sliding or separation of the computer from the support.

An advantage of the present invention is that a computer user is no longer a slave to his or her chair. The computer user may roam to the portion of the laboratory where the data is located, instead of moving either the experiment or clearing space at the experiment's location for his or her computer and keyboard.

Another advantage of the present invention is that a computer user is no longer a slave to his or her monitor. With wireless connections between the keyboard and computer, a computer user may move to the appropriate laboratory or warehouse location to enter data or key in inventory.

Another advantage is cost. Efficiency of the computer user increases as the freedom from his or her chair or monitor increases. Computers break down less often if left in one place and wireless connections are used. If wired connections are used, computers break down less often if isolated from impacts.

Another advantage is comfort. With a cushioned belt worn on top of the hips like a backpack, little effort is needed by the computer user to carry the computer implement.

Another advantage is that the present invention minimizes the computer user's exposure to electronic radiation from the monitor. Electronic radiation through magnetic waves dissipates rapidly with distance. A computer user with a wireless connection between the keyboard and monitor may simply walk away from the monitor or work a short distance away from the monitor.

These and further objects and advantages of the present invention will become clearer in light of the following detailed description of an illustrative embodiment of this invention described in connection with the drawings.

BRIEF DESCRIPTION OF THE DRAWINGS

FIG. 4 is a perspective view which shows the strap on implement support mechanism as it would be on a user, with the flat windings being pushed outwardly (such as by the thighs of a user) and with the implement support tilted upwardly by the flat windings being pushed outwardly.

Figure 1:
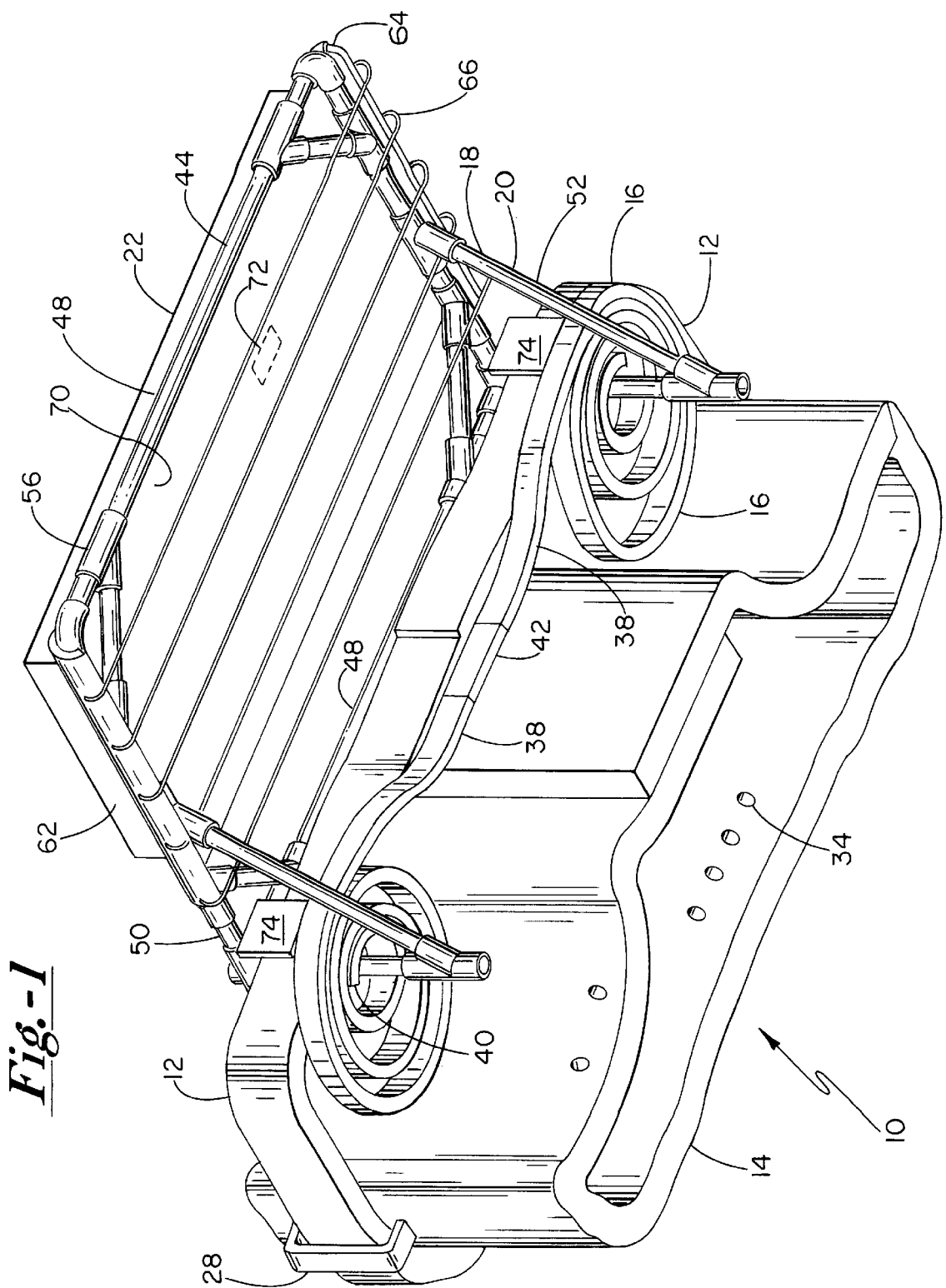
FIG. 1 is a perspective view of the present strap on computer implement support mechanism from a viewpoint under the mechanism
Figure 2:
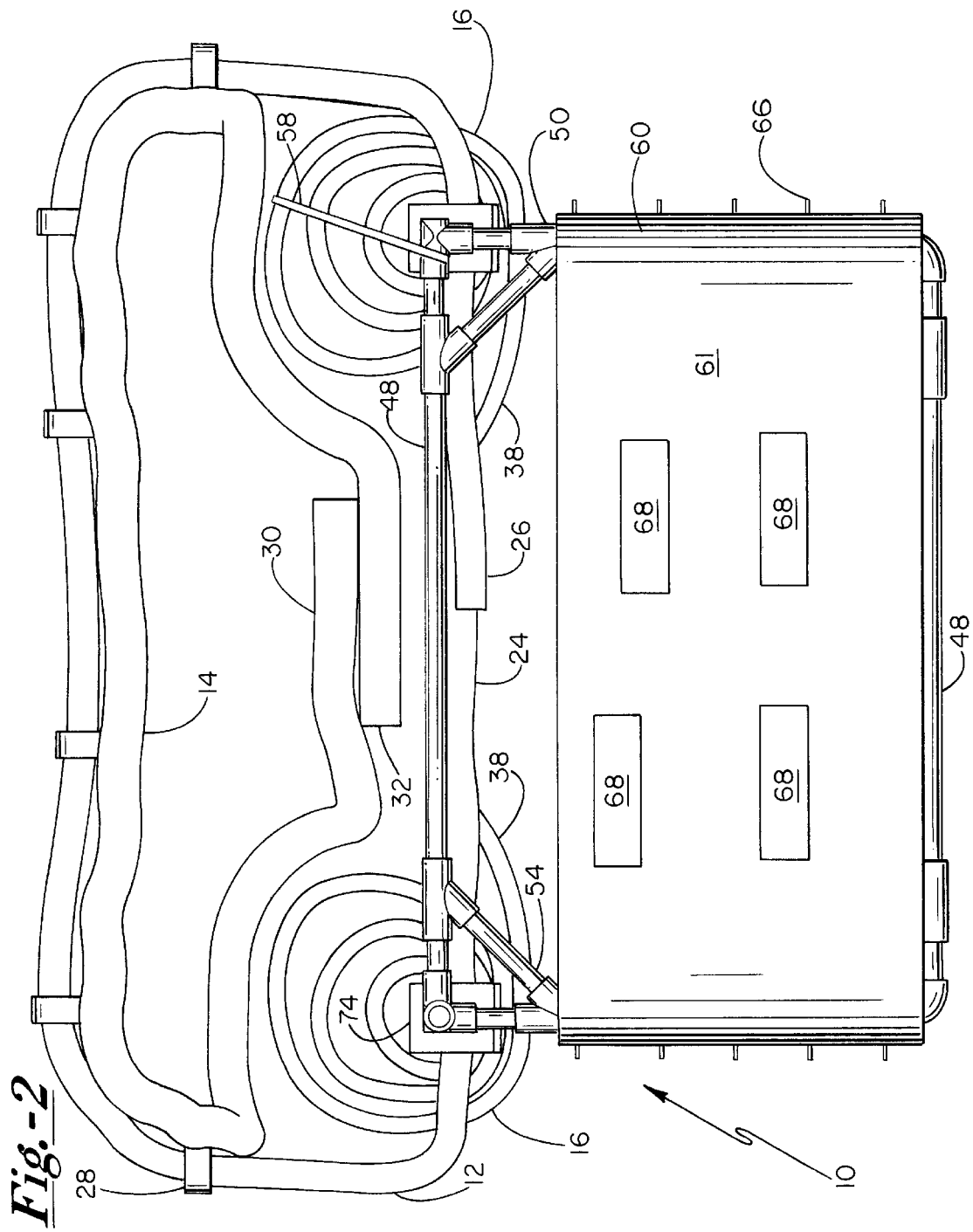
FIG. 2 is a top view of the strap on computer implement support mechanism of FIG. 1.
Figure 3:
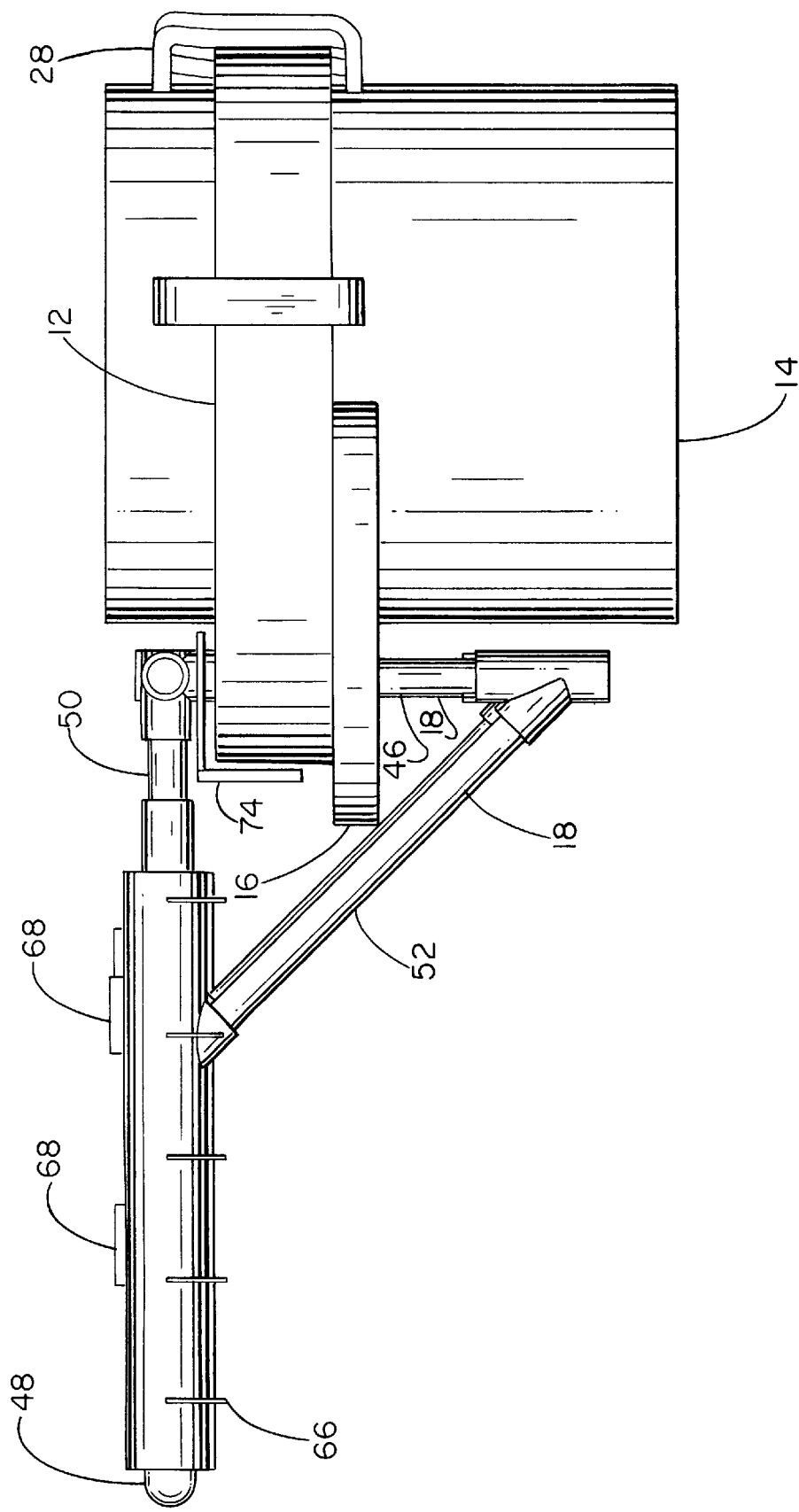
FIG. 3 is a side view of the strap on computer implement support mechanism of FIG. 1.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood. Where used in the various figures of the drawings, the same numerals designate the same or similar parts. Furthermore, when the terms "finer," "outer," "first," and "second" and similar terms are used herein, it should be understood that these terms have reference only to the structure shown in the drawings as it would appear to a person viewing the drawings and are utilized only to facilitate describing the preferred embodiment.

DETAILED DESCRIPTION

As indicated in FIG. 1, the present strap on implement support mechanism is indicated in general by reference numeral 10. The strap on support mechanism 10 generally includes a first or support belt 12, a second belt or wrap around cushion section 14, a resilient mechanism or flat spring steel wind or shock absorber 16, stiff rubber tubes 18, an implement support 20, and an implement 22 such as a keyboard, laptop computer, notebook computer, model airplane or model boat upon which one is working, other piece of artwork, book, food tray with food and drinks, or goods for sale such as cigarettes. Implement 22 is preferably a keyboard, laptop computer, or notebook computer.

More specifically, the first or support belt 12 includes a first end 24 and a second end 26 which are engagable together by a conventional means such as a buckle such that the belt is adjustable in length. The belt 12 is relatively rigid in the vertical direction, such as across its width (i.e., height). The belt 12 may be relatively less rigid in the horizontal direction, such as across its thickness. The belt 12 may be formed of a molded plastic. Belt 12 is preferably a quick release belt.

Inwardly of the first or support belt 12 is the second cushioned belt or wrap around cushion section 14. The cushion section 14 is engaged to the belt 12 via a set of belt loops 28. Loops 28 are stitched to the second belt 14 and the first belt 12 is fed through the loops 28. Belt loops may be relatively rigid with extensions to distribute the load of the belt and apparatus over a broader surface area. Such extensions form part of the loop and are disposed between the belt 12 and the belt 14. These extensions may extend downwardly and may be stitched into or onto belt 14 such that pressure exerted on the rigid belt loop from belt 12 is also exerted onto the extensions which distribute the load from belt 12 over a relatively great area on belt 14.

Cushioned belt 14 includes a first end 30 and a second end 32 which are engaged to each other with a loop and hook connector such as Velcro® on their confronting faces. Or ends 30 and 32 may include a buckle or snaps. Belt 14 is preferably a quick release belt. Cushioned belt 14 is adjustable in length via the loop and hook connector or buckle or snap connector. Cushioned belt 14 is relatively wide in width so as to distribute pressure caused by the first support belt 12 being wrapped snugly about the waist or hips of the computer user and to support the weight of the implement 22. Preferably, cushioned belt 14 is at least as great as the width of an adult's hand from the thumb to the fifth finger. The width of the cushioned belt 14 is at least as great as three times the width of the support belt 12 and is preferably as least as great as four times of the width of the support belt 12. Cushioned belt 14 may be formed of a resilient elastomer or rubber such as neoprene. Cushioned belt 14 preferably is vented via a plurality of holes 34 which are preferably formed throughout the length and width of belt 14. Cushioned belt 14 is further a garment protector.

It should be noted that first belt 12 preferably rides like the belt of a backpack, i.e., on the upper portion of the hips of the computer user instead of being wrapped slightly upwardly on the waist of the computer user. The weight of the support 20 and computer implement 22 is thereby thrust downwardly upon the hips and supported by the hips through belt 14.

Resilient mechanism or flat spring steel wind 16 may be engaged between the cushioned belt 14 and the support 20. Spring 16 includes a first outer end 38 that may be fixed to belt 14 and a second inner end 40 fixed to the support 20. As shown in FIG. 1, outer ends 38 are preferably integral with each other via integral joining portion 42. Alternatively, outer end 38 may be joined back to the wind 16, as shown in FIG. 4. Spring 16 is preferably located under the belt 12. Spring 16 is preferably formed such that first end 38 is in the same plane as second end 40. Spring 16 permits the support 20 to give if the support 20 is inadvertently pushed against an object such as a wall, door, or side of a desk. Spring 16 permits the support 20 to give in any direction, including the vertical and horizontal directions and oblique directions therebetween. Spring 16 also absorbs the shocks of walking. Additionally, flat spring winding 16 may be wrapped with tape or otherwise coated in order to reduce wear on belt 14. Such a wrapping or coating may be located only on the portion of the winding which confronts belt 14.

Support 20 includes a framework 44. Framework 44 includes a plurality of frame portions or tubular members. These frame portions or tubular members include a pair of parallel vertically extending, spaced apart tubes 46, a pair of laterally extending, parallel spaced apart tubes 48, and a pair of forwardly or longitudinally extending, parallel spaced apart tubes 50. Framework 44 further include bracing or obliquely extending, parallel tubes 52 between the vertical tubes 46 and the forwardly extending tubes 50 and a set of four obliquely extending bracing tubes 54 between adjacent forwardly extending tubes 50 and the laterally extending tubes 48. Framework 44 still further includes a plurality of tube connectors 56 for connecting various tubes 46, 48, 50, 52, and 54. Framework 44, instead of defining a square or rectangle, may define one of a number of various shapes such as circles or loop like frameworks such as ellipses. A closed framework is preferred.

It should be noted that tube 46 is pinched at one location between belt 12 and belt 14, and this pinching at one location acts as a pivot. Springs 16 are counteracting forces that work upon tubes 46 below such pivot point to push or tilt the framework 44 upwardly to dispose the framework 44 at a convenient angle for using the implement which is on the framework 44. For example, via spring 16, a keyboard is set at a convenient angle for typing. Springs 16 are pushed from behind by a front portion of the body of the computer user such as the upper portion of the thighs. It should be noted that rear wind sections of flat winding 16 are spaced from each other at a distance which is greater than the distance from which front wind sections of flat winding 16 are spaced from each other. Nylon ties 58 may be extend from the framework 44 (at a central portion of winding 16) to some circumferential portion of winding 16. It is preferred that such nylon ties 58 squeeze front portions of the winding 16 together to customize the position of the framework for the user and his or her implement and find the proper balance for the weight of the implement. It should be noted that vertical tubes 46 are fixed to the inner ends 40 of spring 16. Spring 16 may be perforated or have an undulated or serrated or roughened edge in order to better accommodate nylon ties to custom fit the mechanism 10 to the user. With such perforations, undulating, serrations or roughened edges, slipping or sliding of the nylon ties about the peripheral edge is minimized.

A greater number of belt loops 28 may be located relatively close to where the vertical tubes 46 are pinched between the belts 12 and 14. This provides a better connection in the pivot area where the vertical tubes 46 are pivoted by the springs 16.

Shock absorbers 18 may be found in the form of vertically extending rubber tubes 46 (or rubber rods) and obliquely extending rubbers tubes 52 (or rubber rods) to isolate the support 20 from jarring produced by hitting a wall or door with the support 20 or from jarring produced by body movements of the computer user. Shock absorbers 18 further modestly dampen springs 16. Shock absorbers 18 and springs 16 reduce G-forces on the computer implement 22.

Laterally extending tubes 48 and forwardly extending tubes 50 form a periphery of the framework 44. Engaged to and between the forwardly extending tubes 50 is a tray 60 for engagement with the computer implement 22. Tray 60 is preferably includes a netting or webbing 61. Netting by its nature catches edges and other extensions or protrusions of the computer implement 22 to restrict lateral, longitudinal or other sliding movement of the computer implement 22. Further, netting gives to permit a partial sinking of the computer implement 22 therein such that sides 62 of the computer implement 22 may confront the outermost laterally extending tube 48 and the forwardly extending tubes 50 to still further restrict sliding movement of the computer implement 22. Tray 60 includes its own reinforced fabric or fabric like edges 64 for engagement with the forwardly extending tubes 50 and further includes ties 66 between the reinforced edges 64 to keep the tray 60 from sliding relative to the framework 44. Ties 66 may be flexible or relatively rigid or semi rigid such as plastic ties to restrict an excessive stretch or sink of the netting 61 as well as restricting sliding of the tray 60. Additionally netting 61 allows for venting of air for cooling the computer or other implement 22.

On its upper face, tray 60 includes connectors 68 for removably fixing the computer implement 22 to the support 20. Computer implement 22 on its bottom face 70 includes cooperating connectors 72. Preferably, when engaged, connectors 68 and 72 prevent the computer implement from sliding in the horizontal direction and further are preferably of a sufficient strength to hold the computer implement from falling from the tray 60 even if the tray 60 is held upside down. Preferably, connectors 68 are either hook or loop microscopic connectors such as Velcro® and connectors 72 are the other of the hook or loop microscopic connectors such as Velcro®. The respective surface areas of the connectors 68 and 72 are preferably relatively large and may be determined by the weight of the computer implement 22 so that the computer implement 22 stays affixed to the tray 61 even if the support 20 is flipped upside down.

If desired tray 60 may include, instead of a netting, a relatively rigid material such as a perforated plastic tray. Such a perforated plastic tray also includes connectors 68 and allows for adequate ventilation of the implement 22 such as a computer.

The computer implement 22 may be a keyboard with infrared or other wireless equipment to communicate with a computer. Or the computer implement 22 may be a laptop computer or notebook computer. The computer implement 22 may be a keyboard wired to its computer, but wireless connections between such a keyboard and computer are preferred.

Strap on mechanism 10 further includes a lip or angle iron like piece 74, formed from a rigid or semi rigid material such as plastic, fixed to each of the vertical tubes 46. Angle iron like piece 74 is a belt like loop receiver for the support belt 12, as the support belt 12 draws the vertical tubes 46 towards the body of the computer user. It should be noted that the belt 12 draws the tubes 46 and thus the framework 44 and implement 22 towards the user and belt 14. This assures support of the framework 44. Piece 74 prevents the framework 44 from tilting up too far and sliding down the front of the body.

It should be noted that a reading light or other such light may be mounted on the framework 44.

It may be preferable to provide a third tube 48 between lower portions of tubes 46. Or one may add respective tubes between lower portions of tubes 46 and tubes 54.

The implement 22 may include its own framework 44 or its own support 20 and its own attachments to belt 12. Alternatively, the implement 22 may be engagable to the framework 44 directly.

Thus since the invention disclosed herein may be embodied in other specific forms without departing from the spirit or general characteristics thereof some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A strap on implement support combination, supported exclusively by being strapped about the hip region of a person, comprising:
   a) a belt to be wrapped about the hip region of a person, with the belt being a quick release belt;
   b) a support extending in front of the person;
   c) an implement engagable to the support such that the implement remains on the support during normal activities;
   d) a wrap around cushion section, with the wrap around cushion section being disposed between the belt and the person, with the wrap around cushion section being of sufficient length to extend from the small of the back to over the hips of the person, with the wrap around cushion section and belt being engagable to each other;
   e) wherein the support is supported by the belt at a first location and with the support being pivotable relative to the belt at said first location, with the support comprising a pair of generally vertically extending support portions extending generally downwardly from the first location where the support is pivotable relative to the belt, with each of the generally vertically extending support portions being disposed apart a sufficient lateral distance such that each of the generally vertically extending support portions run downwardly along one of the legs of the person, with the support including a laterally extending portion extending generally for said lateral distance; and
   f) a pair of resilient structures, with each of the resilient structures engaged to one of the generally vertically extending support portions below said belt and below said first location where the support pivots relative to the belt, with said resilient structure being disposed between said generally vertically extending support portion and the wrap around cushion section such that each of the resilient structures confronts the wrap around cushion section.

2. The strap on implement support combination according to claim 1 wherein the wrap around cushion section is engagable to itself.

3. The strap on implement support combination according to claim 1 wherein each of the resilient structures comprises a spring between the belt and the support, with one portion of the spring confronting the belt and with another portion of the spring engaged to the support.

4. The strap on implement support combination according to claim 3 wherein the spring comprises a generally flat spring winding.

5. The strap on implement support combination according to claim 1 wherein the support comprises a quick release connector between the support and the implement, with the quick release connector comprising connector portions which minimize transverse and lateral movement of the implement relative to the support.

6. The strap on implement support combination according to claim 1 wherein the support comprises a framework, with the framework comprising a pair of frame portions disposed transversely of the other, with the support further comprising a net engaged to and between the framework portions, with the net engaging the implement.

7. The strap on implement support combination according to claim 1 wherein the implement comprises a computer.

8. The strap on implement support combination according to claim 1 wherein the implement comprises a keyboard.

9. The strap on implement support combination according to claim 1 wherein the support is tiltable relative to the belt via said first location whereby a more convenient angle is provided for the user of the implement.

10. The strap on implement support combination according to claim 1, wherein the support includes an interior portion, with the interior portion comprising a net.

11. The strap on implement support combination according to claim 1, wherein the support comprises a tray.

12. The strap on implement support combination according to claim 1, wherein each of the resilient structures comprises a spring.

13. The strap on implement support combination according to claim 1, wherein each of the resilient structures comprises a spiral spring.

14. The strap on implement support combination according to claim 1, wherein the resilient structures are engaged to each other.

15. The strap on implement support combination according to claim 1, wherein the resilient structures are integral with each other.

16. The strap on implement support combination according to claim 1, wherein the implement is engaged to the support with quick connectors.

17. The strap on implement support combination according to claim 1, and further comprising a shock absorber between one of the generally vertically extending support portions and another portion of the support.

18. A strap on implement support combination, supported exclusively by being strapped about the hip region of a person, comprising:
   a) a cushioned belt to be wrapped about the hip region of a person;
   b) a support engaged to the belt and extending in front of the person;
   c) a pair of resilient structures engaged to the support to provide give to the support when the support is contacted by an object;
   d) a net in an interior region of the support;
   e) an implement engagable to the net such that the implement remains on the support during normal activities;
   f) wherein the support is supported by the belt at a first location and with the support being pivotable relative to the belt at said first location, with the support comprising a pair of generally vertically extending support portions extending generally downwardly from the first location where the support is pivotable relative to the belt, with each of the generally vertically extending support portions being disposed apart a sufficient lateral distance such that each of the generally vertically extending support portions run downwardly along one of the legs of the person, with the support including a laterally extending portion extending generally for said lateral distance; and
   g) wherein each of the resilient structures is engaged to one of the generally vertically extending support portions below said belt and below said first location where the support pivots relative to the belt, with said resilient structure being disposed between said generally vertically extending support portion and the cushioned belt such that each of the resilient structures confronts the cushioned belt.

19. The strap on implement support combination according to claim 18 wherein the implement comprises a computer implement.

20. The strap on implement support combination according to claim 18 wherein each of the resilient structures comprises a spring.

* * * * *